(12) United States Patent
Grefen et al.

(10) Patent No.: US 9,042,863 B2
(45) Date of Patent: *May 26, 2015

(54) SERVICE CLASSIFICATION OF WEB TRAFFIC

(71) Applicant: Mobixell Networks Ltd., Ra'anana (IL)

(72) Inventors: Stefan Grefen, Nierstein (DE); Yehuda Elmaliach, Hod Hasharon (IL)

(73) Assignee: Flash Networks Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,574

(22) Filed: Feb. 13, 2014

(65) Prior Publication Data

US 2014/0160969 A1    Jun. 12, 2014

Related U.S. Application Data

(63) Continuation of application No. 13/405,310, filed on Feb. 26, 2012, now Pat. No. 8,688,074.

(60) Provisional application No. 61/447,116, filed on Feb. 28, 2011.

(51) Int. Cl.
*H04L 12/26* (2006.01)
*H04L 12/14* (2006.01)
*G06F 17/30* (2006.01)

(52) U.S. Cl.
CPC ...... *H04L 43/0876* (2013.01); *G06F 17/30056* (2013.01); *H04L 43/026* (2013.01); *H04L 12/1432* (2013.01); *H04L 12/1485* (2013.01)

(58) Field of Classification Search
CPC .......... H04L 29/12009; H04L 29/12594; H04L 43/026; H04L 43/0876; H04L 12/1243; H04L 12/1485; H04L 12/1403; H04L 12/14; H04L 12/1482; G06F 17/30056; G06F 17/3002; H04M 15/854; H04W 4/24
USPC .......... 709/224, 248, 203, 232, 233; 455/406, 455/422.1; 707/3, 10, 100, 104; 379/114, 379/126
See application file for complete search history.

(56) References Cited

U.S. PATENT DOCUMENTS 7,107,039 B2 *  9/2006  Liao et al. .............. 455/406
2002/0009286 A1 *  1/2002  Kasutani ................. 386/46
(Continued)

OTHER PUBLICATIONS

Network Working Group Request for Comments: 3986 STD: 66 Updates 1738 Obsoletes: 2732, 2396, 1808 Uniform Resource Identifier: Generic Syntax by T. Berners-Lee.*
(Continued)

*Primary Examiner* — Nizar Sivji
(74) *Attorney, Agent, or Firm* — D. Kligler I.P. Services Ltd.

(57) ABSTRACT

A method for communication includes recording, at a gateway to a network, a generic definition of a service provided to clients of the gateway. The generic definition specifies a first Uniform Resource Identifier (URI) on the network that is associated with the service. At least a first communication between a client and the network is processed at the gateway in order to identify at least a second URI that is referenced from the first URI in a context of the service. Responsively to at least the first communication, an extended definition of the service for the client is automatically created by adding at least the second URI to the generic definition. Use of the service is monitored by applying the extended definition to second communications conveyed by the gateway between the client and the network.

12 Claims, 3 Drawing Sheets

(56) References Cited

U.S. PATENT DOCUMENTS

| | | |
|---|---|---|
| 2008/0065965 A1 | 3/2008 | Hannuksela |
| 2008/0186849 A1 | 8/2008 | Kampmann et al. |
| 2008/0205291 A1 | 8/2008 | Li et al. |
| 2008/0228921 A1 | 9/2008 | Allen |
| 2009/0019149 A1* | 1/2009 | Cohen et al. ............... 709/224 |
| 2009/0021585 A1* | 1/2009 | Ko et al. ................... 348/184 |
| 2009/0083279 A1* | 3/2009 | Hasek ........................ 707/10 |
| 2009/0089445 A1 | 4/2009 | Deshpande |
| 2009/0116551 A1 | 5/2009 | Nilsson et al. |
| 2009/0228625 A1 | 9/2009 | Kulkarni |
| 2009/0259756 A1 | 10/2009 | Karlsson et al. |
| 2009/0285282 A1 | 11/2009 | Amir et al. |
| 2009/0300204 A1 | 12/2009 | Zhang et al. |
| 2010/0118938 A1 | 5/2010 | Fuchs et al. |
| 2010/0121974 A1 | 5/2010 | Einarsson et al. |
| 2010/0268836 A1 | 10/2010 | Jabri et al. |
| 2011/0016209 A1 | 1/2011 | Moncaster et al. |

OTHER PUBLICATIONS

U.S. Appl. No. 13/184,739 Office Action dated Feb. 27, 2014.
U.S. Appl. No. 13/944,912 Office Action dated Dec. 16, 2014.

* cited by examiner

SERVICE CLASSIFICATION OF WEB TRAFFIC

CROSS-REFERENCE TO RELATED APPLICATIONS

This application is a continuation of U.S. patent application Ser. No. 13/405,310, which claims the benefit of U.S. Provisional Patent Application 61/447,116, filed Feb. 28, 2011, which is incorporated herein by reference.

FIELD OF THE INVENTION

The present invention relates generally to data communications, and particularly to monitoring of data transmissions.

BACKGROUND

Network operators offer their subscribers a variety of different payment plans, in which different billing rates are geared to different types of content and services. For example, some types of content may be offered free of charge, others at a flat rate, and still others on a pay-per-use (or pay-per-view) basis. These sorts of billing models are commonly used in cable and satellite entertainment networks, in which the network operator offers multiple, simultaneous content channels and can readily identify which channel each subscriber is viewing at any given time.

This sort of differentiated billing is more complicated to implement in the context of Web-based content and service delivery. Content providers, such as Web site operators, can readily charge subscribers for access to their services; but network operators—who provide the communication link between the content providers and their suppliers—may find it difficult to identify the type of traffic on the link and charge their subscribers accordingly. Some network operators use deep packet inspection (DPI) to snoop inside transmitted packets, but DPI is only partially effective in classifying Web traffic. Therefore, network operators most commonly offer browsing packages in which billing is at a flat rate for all types of content or is based simply on connection time or data volume transmitted and/or received.

SUMMARY

Embodiments of the present invention that are described hereinbelow provide improved methods, apparatus and software for associating communication traffic with services that are provided by the traffic.

There is therefore provided, in accordance with an embodiment of the present invention, a method for communication, which includes recording, at a gateway to a network, a generic definition of a service provided to clients of the gateway. The generic definition specifies a first Uniform Resource Identifier (URI) on the network that is associated with the service. At the gateway, at least a first communication between a client and the network is processed in order to identify at least a second URI that is referenced from the first URI in a context of the service. Responsively to at least the first communication, an extended definition of the service is automatically created for the client by adding at least the second URI to the generic definition. Use of the service is monitored by applying the extended definition to second communications conveyed by the gateway between the client and the network.

In a disclosed embodiment, processing at least the first communication includes processing a second communication conveyed by the gateway between the client and the network in order to identify a third URI that is referenced from the second URI in the context of the service, wherein automatically creating the extended definition includes adding the third URI to the extended definition of the service for the client.

Additionally or alternatively, automatically creating the extended definition includes generating a first extended definition that is specific for a first client, based on at least the first communication between the first client and the first URI, wherein the method includes automatically generating respective further extended definitions that are specific for further clients, based on further communications between the further clients and the first URI, such that at least some of the further extended definitions are different from the first extended definition.

In some embodiments, monitoring the use of the service includes applying the extended definition to the second communications so as to identify content provided from the network to the client in the context of the service. The method may include billing the client for the provided content at a rate that is associated with the service by an operator of the gateway. Alternatively, the generic definition may identify the service as a zero-rated service, wherein the method includes providing the identified content to the client, responsively to the generic definition, free of charge, while billing the client for other content conveyed via the gateway in the context of other services. Monitoring the use of the service may include filtering the identified content so as to identify elements of the content provided from the network that are to be excluded from the context of the service.

In a disclosed embodiment, the first and second communications include Hypertext Transfer Protocol (HTTP) requests and responses, and processing at least the first communication includes extracting request URI and referrer headers from the HTTP requests and responses, and identifying at least the second URI based on one or more of the request URI and referrer headers.

There is also provided, in accordance with an embodiment of the present invention, apparatus for communication, including a network interface, configured to couple multiple clients to communicate with hosts on a network. A processor is configured to apply a generic definition of a service provided to the client via the apparatus, the generic definition specifying a first URI on the network that is associated with the service, in processing at least a first communication between a client and the network in order to identify at least a second URI that is referenced from the first URI in a context of the service, to automatically create, responsively to at least the first communication, an extended definition of the service for the client by adding at least the second URI to the generic definition, and to monitor use of the service by applying the extended definition to second communications conveyed by the apparatus between the client and the network.

There is additionally provided, in accordance with an embodiment of the present invention, a computer software product, including a computer-readable medium in which program instructions are stored, which instructions, when read by a computer, causes the computer to record a generic definition of a service provided to clients via a gateway to a network, the generic definition specifying a first URI on the network that is associated with the service, to process at least a first communication between a client and the network in order to identify at least a second URI that is referenced from the first URI in a context of the service, to automatically create, responsively to at least the first communication, an extended definition of the service for the client by adding at least the second URI to the generic definition, and to monitor use of the service by applying the extended definition to second communications conveyed by the product between the client and the network.

The present invention will be more fully understood from the following detailed description of the embodiments thereof, taken together with the drawings in which:

DETAILED DESCRIPTION OF EMBODIMENTS

Overview

Figure 1:
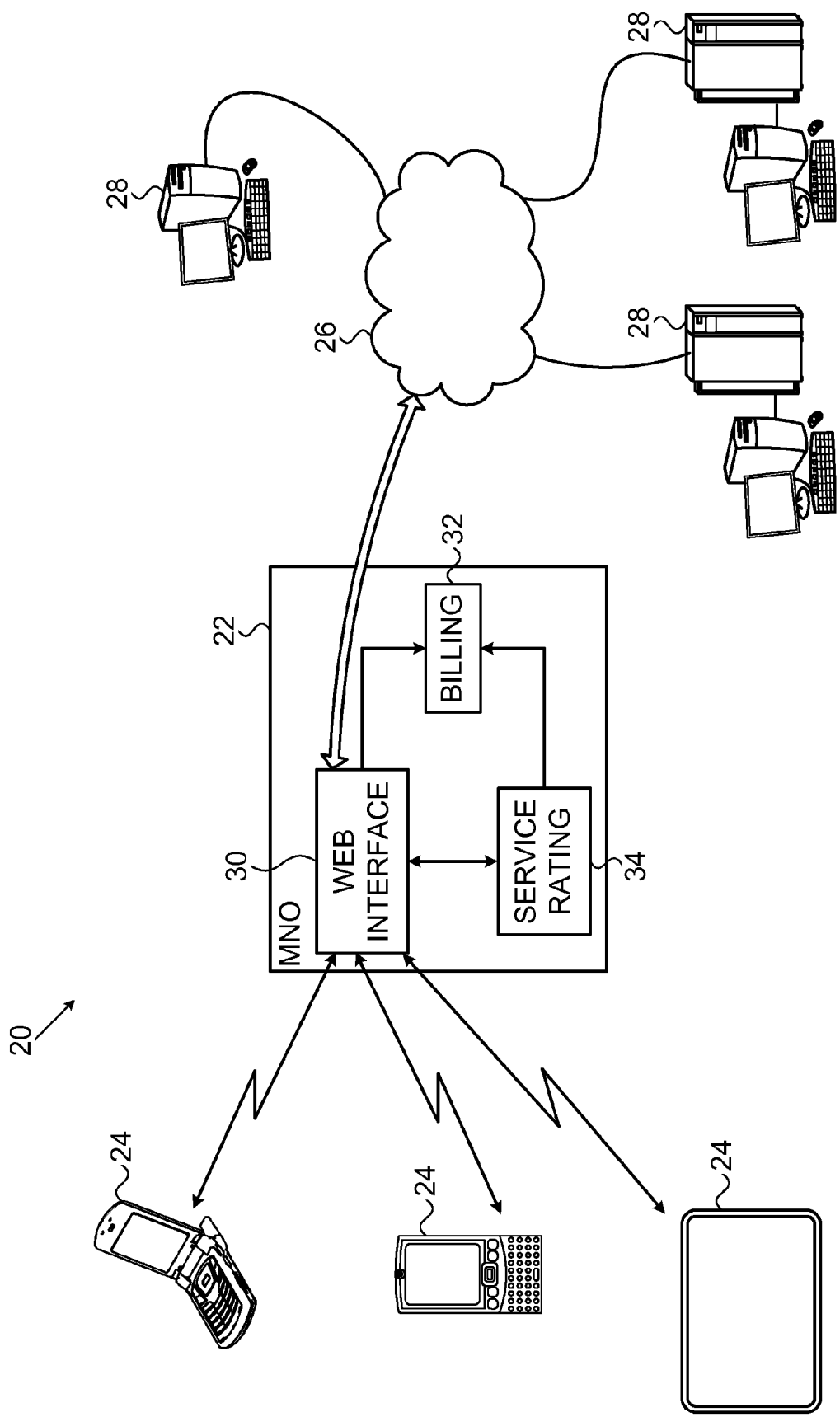
FIG. 1 is a block diagram that schematically illustrates a communication system, in accordance with an embodiment of the present invention.

Network operators who provide browsing packages (particularly—although not exclusively—mobile network operators) may wish to offer subscription plans in which charges for certain services are keyed to the subscriber experience, rather than simply charging for time on line or data volume. For example, the operator may wish to charge in units of Web pages or images downloaded or to charge for certain services at a flat rate, or even to offer access to certain services for no charge (referred to as "zero-rated" services). Such subscription plans depend, however, on the ability of the operator to identify the sources of content downloaded by the client and to associate them reliably with service definitions on which the billing rates are based.

Performing this sort of identification of content in traffic conveyed via the network operator's gateway is not straightforward. When a client downloads a Web page from the Internet, for example, the page frequently includes not only content from the host site from which the client requested the page, but also content from other hosts, such as page components hosted by a content distribution network (CDN), embedded images, links to other sites, and advertisements. These content components are generally downloaded as the result of a dialog of Hypertext Transfer Protocol (HTTP) requests directed by the client to different hosts and HTTP responses returned by these hosts. A network operator attempting to monitor the client's use of Web services will often have difficulty in identifying all of these components as belonging to the same host page and thus to the same service.

Embodiments of the present invention address this difficulty by analyzing communication traffic exchanged between clients and service hosts in order to create an extended service definition for each client of a given service, as the client uses the service. The extended service definition identifies the URIs on the network that contribute components to the service that the specific client is using. It thus enables the network operator to recognize these various components as belonging to the service—and to bill for the service on this basis if desired.

In the disclosed embodiments, a gateway to a network holds a record of a generic definition of a service provided to clients of the gateway. This generic definition typically specifies one or more base URIs on the network that are associated with the service. The gateway processes communications between a given client and one of the hosts identified by the base URI in order to identify other URIs that are referenced from the original URI in the context of the service. Based on these communications, the gateway automatically creates an extended definition of the service for the given client by adding these other URIs to the generic definition. This process of building the extended definition is typically iterative, i.e., communications between these other hosts and the client may be processed in a similar manner in order to identify further URIs that participate in the service, and to add these URIs to the extended definition.

The term "URI," as used in the present description and in the claims, refers to a Uniform Resource Identifier, as defined in Request for Comments (RFC) 3986 of the Internet Engineering Task Force (IETF). One type of URI is a Uniform Resource Locator (URL), which is defined in IETF RFC 3305 and is commonly used in identifying Hypertext Markup Language (HTML) content over HTTP. Another type of URI is a Uniform Resource Name (URN). The term "host," as used in the present description and in the claims, refers to a computer or a group of computers operating in consort. In the context of the Web and HTTP communications, hosts are typically identified by their hostnames or numeric IP address, which are a part of the URLs that refer to them. References herein to a "URI" should therefore be understood as referring implicitly to a host or hosts (and in fact, a URI with appropriate wildcards can be used interchangeably with the domain name of the corresponding host).

The extended definition of a service thus comprises a tree of URIs, each referenced by an "ancestor" URI, with a URI taken from the generic definition of the service at the root. The network operator may specify conditions for adding new URIs to the tree, and may also terminate the tree after a certain number of ancestor generations. The network operator may then apply this extended definition in monitoring use of the service in question by applying the extended definition to subsequent communications conveyed by the gateway between the client and the network. The network operator may thus associate various communications with corresponding services based on the URIs (and possibly other parameters) appearing in the headers of client requests and host responses that are conveyed through the operator's gateway.

Although the extended service definitions for a given service may all take the same generic definition (identifying the host server for the given service, for example) as their point of departure, these extended service definitions will typically differ from client to client, based on the way in which the clients use the service. For example, two different clients accessing a social network service may both begin their interaction at the same URI, but will then typically draw content for display on social network pages via different links to different hosts, depending upon the users' respective interests and circles of friends. Therefore, the network operator will typically maintain and apply the extended service definitions individually for each client, or possibly for certain groups of clients.

The network operator may implement additional measures to ensure, to the extent possible, that each extended definition is correct and complete at the time of its use. For this purpose, the operator may, for example, limit the lifespan of each such extended definition. Even when content is downloaded to the client in packets with headers containing URIs that appear in the extended service definition, the network operator may still filter the content in order to ensure that the content actually belongs to the service. In this manner, the operator may, for example, prevent the spoofing of host names in order to abuse reduced rates for certain services that may be offered by the operator.

The term "service" is used broadly in the context of the present patent application and in the claims to refer to any integrated set of interactions and/or content that is supplied to clients from hosts on a network. Any such service can be defined by the appropriate generic service definition established by the network operator. Service definitions of this sort may comprise, for example, particular Web pages or sites, subscriber services (such as Google Docs™), and/or commercial interactions (such as video on demand and other on-line purchases).

Although the disclosed embodiments relate specifically to provision of Web-based services to mobile network subscribers and to features of HTTP that are commonly used in such services, the principles of the present invention are not limited to this environment. Rather, the techniques described herein may be adapted, mutatis mutandis, to other protocols (such as the Google® SPDY® protocol) and service environments that use a request/response model for client/host interaction, including both mobile and fixed networks.

System Description

FIG. 1 is a block diagram that schematically illustrates a communication system 20, in accordance with an embodiment of the present invention. A mobile network operator (MNO) gateway 22 provides client devices 24 with access to a packet network 26, typically a public network such as the Internet. Users of client devices 24 (who are typically subscribers of the MNO) are thus able to access services provided by host computers 28, such as servers, on network 26. In the description that follows, for the sake of brevity and simplicity, host computers 28 are referred to simply as hosts, and client devices 24 are referred to as clients. The mobile network operated by the MNO is assumed to be a cellular network, and the interaction between clients 24 and hosts 28 is assumed to use HTTP. As noted earlier, however, these particular features of system 20 are described by way of example, and not limitation.

Gateway 22 provides a network interface 30 for communication between clients 24 on the mobile network and public network 26. A service rating processor 34, associated with interface 30, examines HTTP requests and responses passing through the interface in order to identify the network services used by clients 24 and to track transactions between clients and such services. For this purpose, processor 34 generates and applies extended service definitions, as explained herein. Service rating processor 34 passes information regarding these service identifications and transactions to a billing processor 32, which bills subscribers for use of the various services at rates that are set by the mobile network operator. As noted earlier, some such services may be offered to subscribers at a flat rate (which may be zero), while others are charged on the basis of transactions (in terms of content items downloaded or other units), data volume, or elapsed time, for example.

Service rating processor 34 typically comprises a general-purpose computer, with suitable connections to interface 30 and billing processor 32. Although interface 30 and processors 32 and 34 are shown and described, for the sake of clarity, as separate functional blocks, the functions of these elements may be integrated in a single computer or distributed among a cluster or other group of computers. The terms "processor" and "computer," as used in the context of the present patent application and in the claims, should thus be understood as referring, as well, to a group of processors or computers operating in consort. The computer or computers carry out the functions described herein under the control of software, which may be downloaded in electronic form, over a network, for example, and/or stored in tangible computer-readable media, such as optical, magnetic, or electronic memory media. Alternatively or additionally, at least some of the functions of Web interface 30 and processors 32 and may be carried out by dedicated or programmable hardware logic.

Method of Operation

Figure 2:
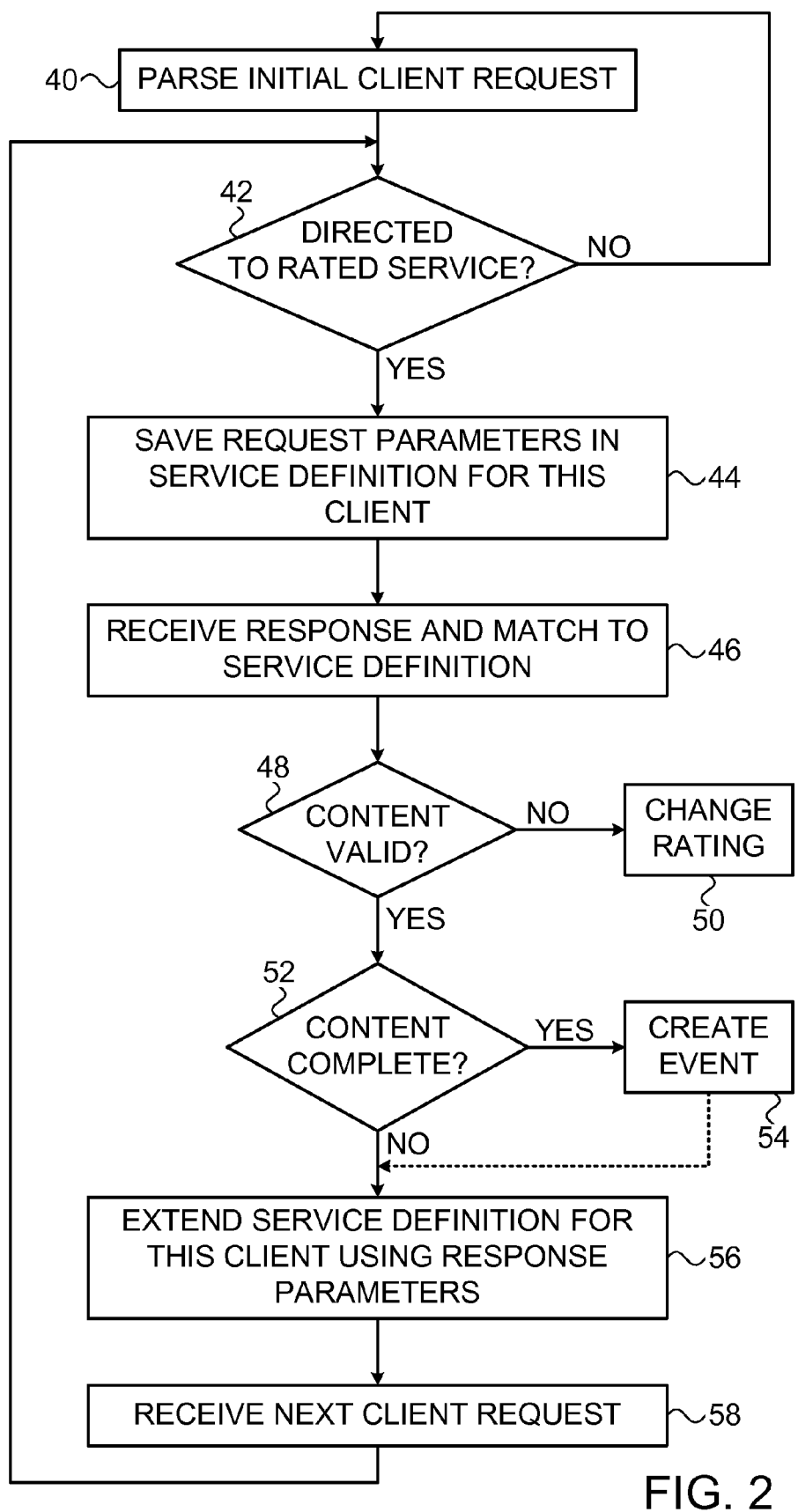
FIG. 2 is a flow chart that schematically illustrates a method for processing communication traffic, in accordance with an embodiment of the present invention.

FIG. 2 is a flow chart that schematically illustrates a method for processing communication traffic, in accordance with an embodiment of the present invention. The method is described hereinbelow, for the sake of clarity and convenience, with reference to system and specifically to Web traffic conveyed through gateway 22, but the principles of this method may similarly be applied in other sorts of networks, service configurations, and protocols.

Upon receiving an initial HTTP request at Web interface 30 from one of clients 24 to access a service on network 26, processor 34 parses the request to extract request and header parameters, at a parsing step 40. Specifically, the processor may extract the destination IP address, the HTTP host header, and the URL path and query string from the request. The HTTP referrer header may also be parsed at this step, and other request parameters, such as cookies, etags, and validity information may be extracted and saved for use in identifying and sorting subsequent HTTP responses directed to this client. Processor 34 may timestamp the information that it collects.

Processor 34 checks the parameters extracted from each client request against a set of service definitions, at a matching step 42. These definitions include generic service definitions that have been predefined by the MNO and extended, client-specific service definitions that have been constructed by the processor, as described below. For HTTP, if the request URI does not match the extended service description, the processor may check the referrer header, to ascertain whether the request is part of the same service (in which case the request URI should be added to the extended service definition belonging to the client from which the request is received). If the client request checked at step 42 does not match any of the service definitions, gateway 22 will typically treat the request as generic Web traffic, to be handled (and billed) in the manner defined by the MNO.

Typically, the request URI (as defined by HTTP) is the key indicator in matching HTTP requests and responses to the service definition. In the service definition the host part of the URI is usually expressed as a hostname, but in the request the host may be available only as an IP address when the client browser does not provide a host header or uses an IP address in the host header. Domain Name Service (DNS) aliases complicate the mapping of the IP address to the correct hostname. To ensure proper mapping, gateway 22 may automatically collect these IP addresses and aliases, and may refresh them at intervals set by the MNO. One way for processor 34 to collect the IP addresses for this purpose is to snoop on DNS requests in order to map the IP addresses in the DNS responses to the appropriate domain names. These IP addresses may also be used, together with the host names, in matching HTTP responses to extended service definitions in order to reduce possible ambiguity in the names.

Figure 3:
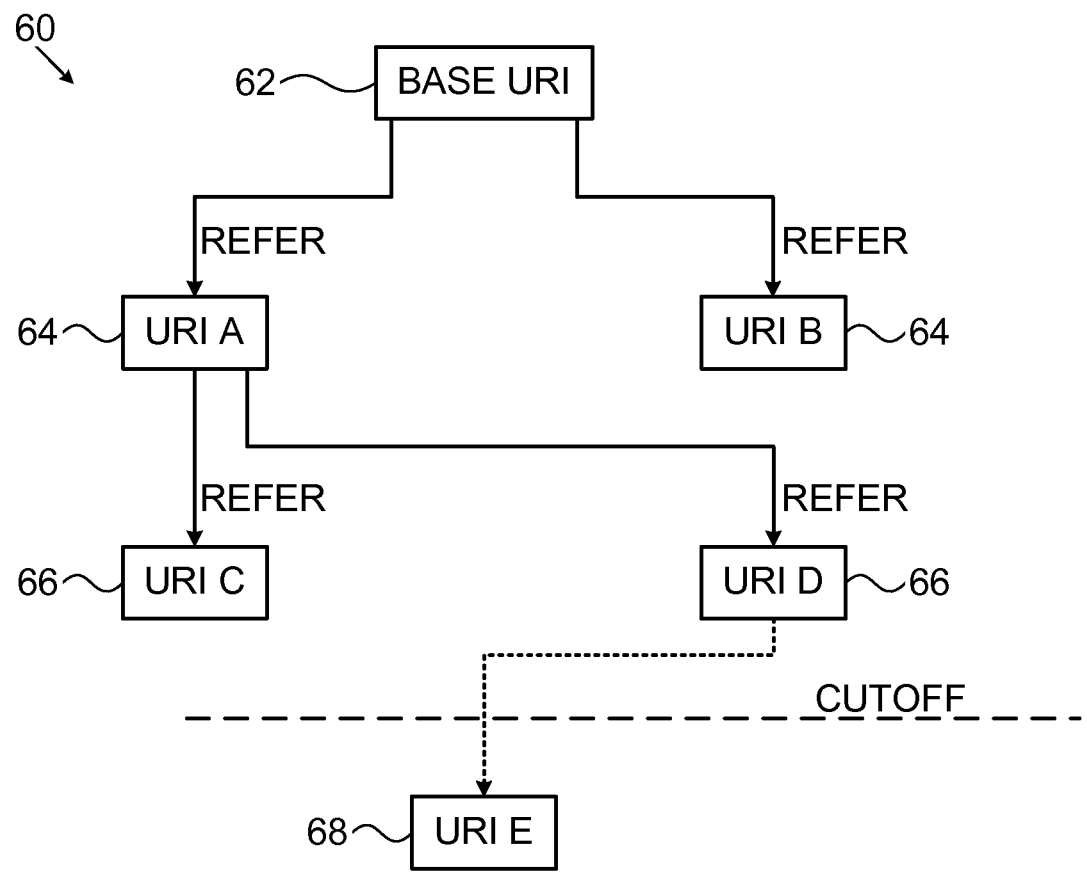
FIG. 3 is a block diagram that schematically illustrates a data structure associated with a service definition, in accordance with an embodiment of the present invention.

Upon finding that the client request matches an existing service definition, processor 34 saves the request parameters, at a request saving step 44. Specifically, the processor notes the request URI to which the HTTP request is directed, as well as the referrer URI in the request, and uses these URIs in building the extended service definition for the requesting client. The URI in the initial client request from step 40, which was found at step 42 to match the generic service definition, will be the root of a tree of hosts in the extended service definition, as illustrated in FIG. 3. When the referrer header in a client HTTP request matches a URI in the extended service definition, the host URI of the page requested by the client may also be added to the extended service definition for this client. As noted earlier, the extended service definition is client-specific, and different clients may have different extended definitions for the same service, based on the hosts that they access in their interaction with the service.

Multiple generations of request and referrer URIs may be added to the tree in this manner in successive iterations through step 44, including URIs that were referred from other URIs in subsequent HTTP requests and responses and were not in the original generic service definition. Ancestor and child URIs may be added up to a maximum depth that may be configured by the MNO. The time span between the client request to an ancestor URI and a subsequent request to a possible child URI may be taken into account in deciding whether to add the child URI to the tree, since a large elapsed time will tend to indicate that the child request does not belong to the same service as the ancestor. Some or all of these URIs may be added to the extended service definition. The above-mentioned provisional patent application presents two examples of such chains of request URIs and referrers.

When interface 30 receives a HTTP response from network 26, processor 34 may parse the response in order to extract further embedded URIs belonging to the same service, at a response processing step 46. The processor may also check cookies, etags and other information in the HTTP responses against the corresponding information of this sort that was saved at step 44. To reduce ambiguity at step 46, processor 34 may compare the time of arrival of the HTTP response to the timestamp that is associated with the request parameters in the extended service definition, and may accept as belonging to the service only those responses that are received within a certain maximum time of the corresponding requests.

As explained above, responses classified at step 46 as belonging to a given service may originate from any URI in the extended service definition of the client to which the response is directed. These responses may thus include embedded content that is incorporated into pages belonging to the service, such as images, stylesheets and framed content (even when the referrer header does not refer to the service URI). For example, a home page requested by a client may refer the client to a stylesheet from a CDN, which in turn refers to certain images from another URI. Linked content, which is referenced from a page belonging to the service, may also be classified as part of the service. Service rating processor 34 may then instruct billing processor 32 to bill the client for all of this embedded and linked content at the rate that the MNO has set for the service in question.

To aid in proper rating and avoid possible errors and abuse, processor 34 may perform additional checks of the HTTP responses that are processed at step 46. For example, the processor may filter the content of the HTTP responses, at a validity checking step 48. This step (which could be performed as a part of step 46) may be useful mainly because HTTP headers are not protected and can be spoofed by browser extensions, mobile applications, and malware. The identification of a given service based on headers alone could therefore be abused to deliver large volumes of data that do not belong to the service, thus causing the MNO to lose revenues. Valid content may be identified, for example, by parsing the HTML code of an incoming page to find all links that are part of the page and not links to outside content. This distinction may be made based on HTML tags (since href tags point to links leaving the service, while tags such as img, iframe and script point to content that is required for this service/page). Links found to contain valid content can be added to the tree for subsequent validation.

When service rating processor 34 determines that the content of a given response does not match data patterns or other parameters appropriate for the service that is indicated by the HTTP header, it excludes the content from the service and instructs billing processor 32 to change the billing rate for the response, at a rate changing step 50. Processor 34 may pass a message to the client 24 to which the response is directed to inform the client of the rating change.

Processor 34 may also track content that is delivered by successive HTTP responses in the context of a given service in order to detect when a content transaction is completed, at a completion checking step 52. Such a transaction may comprise, for example, presentation of an entire Web page with content from a number of different URIs, based on parsing the links in the page, as described above. Alternatively or additionally, the transaction may comprise more complex interactions, such as delivery of a video program on demand or upload of an image to a service provider. The MNO may program processor 34 to generate an event upon completion of a given transaction, at an event creation step 54. The event may trigger a specified response, such as billing the client's account or changing the service rating. Again, processor 34 may notify clients when such events occur.

When processor 34 has identified a response to a client from a given host as belonging to a given service, the processor may add parameters of the response to the extended service definition of the client, at a response extension step 56, in the general manner described above.

The method of FIG. 2 continues through multiple iterations, typically for as long as the client in question is interacting with the service. Thus, upon receiving the next HTTP request submitted by the client, at a new request step 58, processor 34 parses the new request, and then proceeds with analysis of the request parameters at step 42, as described above.

FIG. 3 is a block diagram that schematically illustrates a data structure, in the form of a tree 60, which is created by processor 34 as part of an extended service definition, in accordance with an embodiment of the present invention. The nodes of the tree contain URIs that make up the extended service definition. A root node 62 of the tree (also referred to simply as the "root") identifies the base URI of the service, as provided by the generic definition of the service. Typically, the base URI belongs to a server to which the client sends an initial request (and possibly subsequent requests) to receive service content.

Responses from the base URI reference other URIs outside the service definition—identified in the figure as "URI A" and "URI B"—which may, for example, provide content to be incorporated in Web pages of the service. Clients direct HTTP requests to these URIs with referrer headers referencing the base URI. On this basis, processor 34 adds URI A and URI B in first tier nodes 64 in tree 60. Their ancestor is root node 62.

Responses to the client from URI A reference additional URIs, identified in FIG. 3 as "URI C" and "URI D." These URIs are added to tree 60 as second-tier nodes 66, with node 64 of URI A as their ancestor. Finally (in this simple scenario), URI D references a third-tier URI, identified as "URI E" at a third-tier node 68. The service rating parameters set by the MNO in this case, however, may specify that nodes are to be added to tree 60 for only two generations. As a result, node 68 is cut off, and requests to URIs below this cutoff are not included in the extended service definition.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for monitoring communication services, comprising:
   at a gateway to a network, managing a set of service definitions corresponding to respective services, each service definition specifying a base Uniform Resource Identifier (URI) on the network that is associated with the corresponding service of the service definition;
   processing at the gateway communications between a client and the network in order to identify communications with URIs specified in one of the managed service definitions;
   extracting, from communications with URIs specified in respective service definitions, URIs referenced by the communications, and adding the extracted referenced URIs to the corresponding service definitions;
   monitoring use of the services by determining for the communications between the client and the network, respective services to which the communications relate, by comparing the URIs of the communications to URIs in the service definitions; and
   billing the client for content provided to the client in the communications responsive to respective rates associated with the services to which the communications relate, by an operator of the gateway,
   wherein monitoring the use of the services comprises filtering the identified content determined to relate to a specific service so as to identify whether a data pattern of the content matches a pattern of the service and excluding non-matching content from the context of the service.

2. The method according to claim 1, wherein extracting URIs referenced by the communications, comprises extracting from communications with URIs that are different from the base URIs of their corresponding service definition.

3. The method according to claim 1, wherein managing are set of service definitions comprises managing separate service definitions for a plurality of different clients.

4. The method according to claim 1, wherein the communications comprise Hypertext Transfer Protocol (HTTP) requests and responses, and wherein processing the communications comprises extracting request URI and referrer headers from the HTTP requests and responses, and identifying referred URIs based on one or more of the request URI and referrer headers.

5. Apparatus for monitoring communication services, comprising:
   a network interface, configured to couple multiple clients to communicate with hosts on a network;
   a memory configured with a set of service definitions corresponding to respective services, each service definition specifying a base Uniform Resource Identifier (URI) on the network that is associated with the corresponding service of the service definition; and
   a processor, which is configured to processing communications between a client and the network in order to identify communications with URIs specified in one of the managed service definitions, to extract, from communications with URIs specified in respective service definitions, URIs referenced by the communications, to add the extracted referenced URIs to the corresponding service definitions, to monitor use of the services by determining for the communications between the client and the network, respective services to which the communications relate, by comparing the URIs of the communications to URIs in the service definitions, to bill the client for content provided to the client in the communications, responsive to respective rates associated with the services to which the communications relate, by an operator of the apparatus, and to filter the identified content determined to relate to a specific service so as to identify whether a data pattern of the content matches a pattern of the service and excluding non-matching content from the context of the service.

6. The apparatus according to claim 5, wherein the processor is configured to identify communications with URIs different from the base URIs of the managed service definitions.

7. The apparatus according to claim 5, wherein the processor is configured to manage separate service definitions for a plurality of different clients.

8. The apparatus according to claim 5, wherein the communications comprise Hypertext Transfer Protocol (HTTP) requests and responses, and wherein the processor is configured to extract request URI and referrer headers from the HTTP requests and responses, and to identify referred URIs based on one or more of the request URI and referrer headers.

9. A computer software product, comprising a non-transitory computer-readable medium in which program instructions are stored, which instructions, when read by a computer, cause the computer to manage a set of service definitions corresponding to respective services, each service definition specifying a base Uniform Resource Identifier (URI) on the network that is associated with the corresponding service of the service definition, to process communications between a client and the network in order to identify communications with URIs specified in one of managed service definitions, to extract, from communications with URIs specified in respective service definitions, URIs referenced by the communications, to add the extracted referenced URIs to the corresponding service definitions, to monitor use of the services by determining for the communications between the client and the network, respective services to which the communications relate, by comparing the URIs of the communications to URIs in the service definitions, to bill the client for content provided to the client in the communications, responsive to respective rates associated with the services to which the communications relate and to filter the identified content determined to relate to a specific service so as to identify whether a data pattern of the content matches a pattern of the service and excluding non-matching content from the context of the service.

10. The product according to claim 9, wherein the instructions cause the computer to identify communications with URIs different from the base URIs of the managed service definitions.

11. The product according to claim 9, wherein the instructions cause the computer to manage separate service definitions for a plurality of different clients.

12. The product according to claim 9, wherein the communications comprise Hypertext Transfer Protocol (HTTP) requests and responses, and wherein the instructions cause the computer to extract request URI and referrer headers from the HTTP requests and responses, and to identify referred URIs based on one or more of the request URI and referrer headers.

* * * * *